(12) United States Patent
Sugimoto et al.

(10) Patent No.: US 11,198,755 B2
(45) Date of Patent: Dec. 14, 2021

(54) EPOXY RESIN, EPOXY RESIN COMPOSITION CONTAINING SAME, AND CURED PRODUCT USING SAID EPOXY RESIN COMPOSITION

(71) Applicant: DIC Corporation, Tokyo (JP)

(72) Inventors: Nana Sugimoto, Ichihara (JP); Koji Hayashi, Ichihara (JP); Gaku Ehara, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 16/630,026

(22) PCT Filed: Jul. 5, 2018

(86) PCT No.: PCT/JP2018/025481
§ 371 (c)(1),
(2) Date: Jan. 10, 2020

(87) PCT Pub. No.: WO2019/013081
PCT Pub. Date: Jan. 17, 2019

(65) Prior Publication Data
US 2021/0095068 A1    Apr. 1, 2021

(30) Foreign Application Priority Data
Jul. 14, 2017   (JP) .............................. JP2017-138024

(51) Int. Cl.
C08G 59/32   (2006.01)
C08G 59/06   (2006.01)
C08L 63/00   (2006.01)

(52) U.S. Cl.
CPC ............. *C08G 59/32* (2013.01); *C08G 59/06* (2013.01); *C08L 63/00* (2013.01)

(58) Field of Classification Search
CPC .......... C08G 59/32; C08G 59/06; C08L 63/00
USPC ....................................................... 525/404
See application file for complete search history.

(56) References Cited

FOREIGN PATENT DOCUMENTS

| JP | 61186377 A | * | 8/1986 | ........... C07D 303/27 |
|----|------------|---|--------|----------------------|
| JP | S61-186377 A | | 8/1986 | |

OTHER PUBLICATIONS

Kubodera et al., JP 61186377 A machine translation in English, Aug. 20, 1986 (Year: 1986).*
International Search Report dated Sep. 11, 2018, issued for PCT/JP2018/025481.

* cited by examiner

*Primary Examiner* — David T Karst
(74) *Attorney, Agent, or Firm* — Locke Lord LLP; James E. Armstrong, IV; Nicholas J. DiCeglie, Jr.

(57) ABSTRACT

The present invention provides an epoxy resin including a reaction product of 1,2,4-trihydroxybenzene and an epihalohydrin, the epoxy resin containing a cyclic compound that has a cyclic structure containing, as constitutional atoms, oxygen atoms at 1-position and 2-position derived from 1,2,4-trihydroxybenzene, the cyclic compound being contained in an amount of 0.003 to 0.070 mol based on 100 g of the epoxy resin. The epoxy resin is liquid and is excellent in pyrolysis resistance.

6 Claims, 1 Drawing Sheet

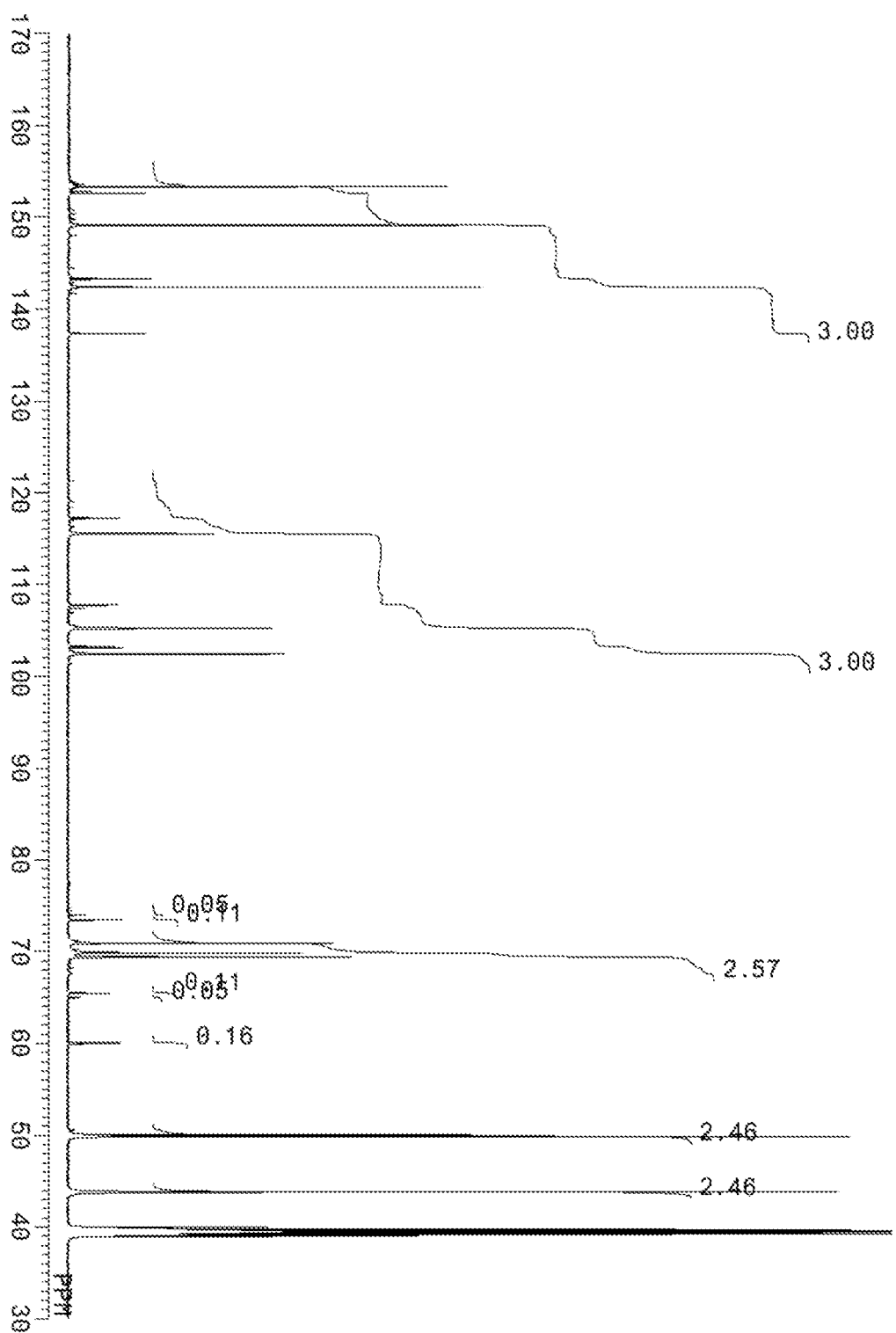

EPOXY RESIN, EPOXY RESIN COMPOSITION CONTAINING SAME, AND CURED PRODUCT USING SAID EPOXY RESIN COMPOSITION

TECHNICAL FIELD

The present invention relates to an epoxy resin, an epoxy resin composition containing the same, and a cured product produced by using the epoxy resin composition.

BACKGROUND ART

Epoxy resin is a curable resin that contains epoxy groups in its molecule and can be cured with a crosslinked network formed by the epoxy groups. Cured products of epoxy resins are excellent in mechanical strength, thermal resistance, water resistance, insulation properties, and the like, and thus are widely used in a matrix for a fiber-reinforced composite material, a heat dissipation member, an adhesive, a paint, a semiconductor, a printed circuit board, and other applications.

The diglycidyl ether form of bisphenol A, which is widely used as such an epoxy resin, is bifunctional and therefore has been restricted in use for applications in which thermal resistance is required. Thus, a tri- or higher-functional epoxy resin has heretofore been studied.

For example, PTL 1 discloses that a polyepoxy compound of 1,2,4-triglycidyloxybenzene can be obtained by reacting 1,2,4-trihydroxybenzene (1,3,4-benzenetriol) with an epihalohydrin in the presence of a catalyst to produce a 1,2,4-trihydroxybenzene epihalohydrin ether and then reacting the 1,2,4-trihydroxybenzene epihalohydrin ether with an alkali metal compound. PTL 1 discloses, for example, that the polyepoxy compound, which is trifunctional, is superior in thermal resistance, is liquid with low viscosity at a normal temperature, and does not crystallize even at a low temperature.

CITATION LIST

Patent Literature

PTL 1: JP-A-61-186377

SUMMARY OF INVENTION

Technical Problem

In various applications of cured products of epoxy resins, manufactured articles have recently been increasingly reduced in size and improved in performance and thus, epoxy resins are also required to have higher performance.

Since the epoxy resin disclosed in PTL 1 is trifunctional, a cured product thereof has a certain level of thermal resistance. However, the epoxy resin has been found to be poor in pyrolysis resistance.

Note that, from the viewpoint of increasing pyrolysis resistance, it is conceived to purify, rather than the epoxy resin disclosed in PTL 1, a triglycidyl form of 1,2,4-triglycidyloxybenzene which is a product. However, it has been found that the triglycidyl form of 1,2,4-triglycidyloxybenzene is a crystal compound and is poor in handleability.

Thus, an object of the present invention is to provide an epoxy resin that is liquid and that can provide a cured product excellent in pyrolysis resistance.

Solution to Problem

The present inventors have intensively and extensively studied for solving the above problem. As a result, they have found that the above problem can be solved by controlling the content of a particular compound that may be contained in an epoxy resin obtained by epoxidation of 1,2,4-trihydroxybenzene, thereby completing the present invention.

Specifically, the present invention relates to an epoxy resin including a reaction product of 1,2,4-trihydroxybenzene and an epihalohydrin. Here, the epoxy resin contains a cyclic compound that has a cyclic structure containing, as constitutional atoms, oxygen atoms at 1-position and 2-position derived from 1,2,4-trihydroxybenzene, the cyclic compound being contained in an amount of 0.003 to 0.070 mol based on 100 g of the epoxy resin.

Advantageous Effects of Invention

The present invention can provide an epoxy resin that is liquid and can provide a cured product excellent in pyrolysis resistance.

BRIEF DESCRIPTION OF DRAWING

FIG. 1 is a $^{13}C$ NMR chart of an epoxy resin produced in Example 1.

DESCRIPTION OF EMBODIMENTS

An embodiment of the present invention will be described in detail below.

<Epoxy Resin>

An epoxy resin according to this embodiment is a reaction product of 1,2,4-trihydroxybenzene and an epihalohydrin.

When 1,2,4-trihydroxybenzene is reacted with an epihalohydrin, a glycidylation reaction typically proceeds on hydroxy groups at the 1-position, the 2-position, and the 4-position of 1,2,4-trihydroxybenzene to produce the triglycidyl ether form (1,2,4-triglycidyloxybenzene). However, various other reactions may proceed, and as a result, the reaction product of 1,2,4-trihydroxybenzene and an epihalohydrin may contain various epoxy compounds. Physical properties of the epoxy resin as such a reaction product and physical properties of a cured product thereof may be influenced by not only the triglycidyl ether form of 1,2,4-trihydroxybenzene but also by other compounds contained therein.

In contrast, in the epoxy resin according to this embodiment, focusing on a particular cyclic compound which may be contained in a reaction product, the content of the cyclic compound is controlled. It has been found that crystallization of the epoxy resin can thus be suppressed and the resulting cured product is excellent in pyrolysis resistance.

[1,2,4-Trihydroxybenzene]

1,2,4-Trihydroxybenzene has a structure represented by the following chemical formula.

[Chem. 1]

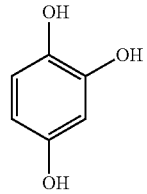

[Epihalohydrin]

The epihalohydrin is not particularly limited, but examples thereof include epichlorohydrin, epibromohydrin, β-methylepichlorohydrin, and β-methylepibromohydrin. The epihalohydrins may be used alone or in combination of two or more thereof.

The amount of the epihalohydrin used is not particularly limited, but preferably 1.2 to 20 mol and more preferably 1.5 to 10 mol based on 1 mol of the hydroxy group in 1,2,4-trihydroxybenzene. When the amount of the epihalohydrin used is 1.2 mol or more, other compounds that may be contained in the epoxy resin are easily controlled, and thus such an amount is preferred. On the other hand, when the amount of the epihalohydrin used is 20 mol or less, the cost is lowered from the viewpoint of the yield, and thus such an amount is preferred.

[Reaction]

The process of the reaction of 1,2,4-trihydroxybenzene and an epihalohydrin is not particularly limited, and the reaction may be performed by any known process. In one embodiment, a process of the reaction includes a step (1) of subjecting a mixture containing 1,2,4-trihydroxybenzene and an epihalohydrin to a reaction in the presence of a quaternary onium salt and/or a basic compound and a step (2) of subjecting a reaction product obtained in the step (1) to a ring-closing reaction in the presence of a basic compound.

(Step (1))

The step (1) is a step of subjecting a mixture containing 1,2,4-trihydroxybenzene and an epihalohydrin to a reaction in the presence of a quaternary onium salt and/or a basic compound.

Mixture

The mixture contains 1,2,4-trihydroxybenzene and an epihalohydrin. Besides them, the mixture may contain a reaction solvent or the like as required.

1,2,4-Trihydroxybenzene and Epihalohydrin

The 1,2,4-trihydroxybenzene and the epihalohydrin are as described above and thus the explanation is omitted here.

Reaction Solvent

The reaction solvent is not particularly limited, but examples thereof include an alcohol, such as methanol, ethanol, isopropyl alcohol, or butanol; a ketone, such as acetone or methyl ethyl ketone; an ether, such as dioxane; dimethyl sulfone; and dimethyl sulfoxide. The reaction solvents may be used alone or in combination of two or more thereof.

When a reaction solvent is used, the amount of the solvent added is preferably 5 to 150 parts based on 100 parts of the epihalohydrin, more preferably 7.5 to 100 parts, and further preferably 10 to 50 parts.

Quaternary Onium Salt

The quaternary onium salt has the function of promoting the reaction in the step (1) described later.

The quaternary onium salt is not particularly limited, but examples thereof include a quaternary ammonium salt and a quaternary phosphonium salt.

The quaternary ammonium salt is not particularly limited, but examples thereof include chloride salts of a tetramethylammonium cation, a methyltriethylammonium cation, a tetraethylammonium cation, a tributylmethylammonium cation, a tetrabutylammonium cation, a phenyltrimethylammonium cation, a benzyltrimethylammonium cation, a phenyltriethylammonium cation, a benzyltriethylammonium cation, and a benzyltributylammonium cation, and bromide salts of a tetramethylammonium cation, a trimethylpropylammonium cation, a tetraethylammonium cation, and a tetrabutylammonium cation.

The quaternary phosphonium salt is not particularly limited, but examples thereof include bromide salts of a tetraethylphosphonium cation, a tetrabutylphosphonium cation, a methyltriphenylphosphonium cation, a tetraphenylphosphonium cation, an ethyltriphenylphosphonium cation, a butyltriphenylphosphonium cation, and a benzyltriphenylphosphonium cation.

Among them, a chloride salt of a tetramethylammonium cation, a benzyltrimethylammonium cation, or a benzyltriethylammonium cation, or a bromide salt of a tetrabutylammonium cation is preferably used as a quaternary onium salt.

Note that the above-mentioned quaternary onium salts may be used alone or in combination of two or more thereof.

The amount of the quaternary onium salt added is preferably 0.15 to 5% by mass based on the total mass of the 1,2,4-trihydroxybenzene and the epihalohydrin, and more preferably 0.18 to 3% by mass. When the amount of the quaternary onium salt added is 0.18% by mass or more, the reaction in the step (1) may suitably proceed, and thus such an amount is preferred. On the other hand, when the amount of the quaternary onium salt added is 3% by mass or less, side reactions can be prevented or suppressed, and thus such an amount is preferred.

Basic Compound

The basic compound also has the function of promoting the reaction in the step (1) described later as with the quaternary onium salt.

The basic compound is not particularly limited, but examples thereof include potassium hydroxide, sodium hydroxide, barium hydroxide, magnesium oxide, sodium carbonate, and potassium carbonate. Among them, potassium hydroxide or sodium hydroxide is preferably used. Note that the basic compounds may be used alone or in combination of two or more thereof.

The amount of the basic compound added is not particularly limited, but is preferably 0.01 to 0.3 mol per mole of the phenolic hydroxy group in the 1,2,4-trihydroxybenzene, and more preferably 0.02 to 0.2 mol. When the amount of the basic compound added is 0.01 mol or more, the reaction in the step (2) described later may suitably proceed, and thus such an amount is preferred. On the other hand, when the amount of the basic compound added is 0.3 mol or less, side reactions can be prevented or suppressed, and thus such an amount is preferred.

Note that the quaternary onium salts and the basic compounds may be used alone or in combination.

Reaction in Step (1)

The reaction in the step (1) mainly includes a reaction in which the hydroxy groups in 1,2,4-trihydroxybenzene react with an epihalohydrin to produce a tris(3-halogeno-2-hydroxypropyl ether) intermediate as shown below.

[Chem. 2]

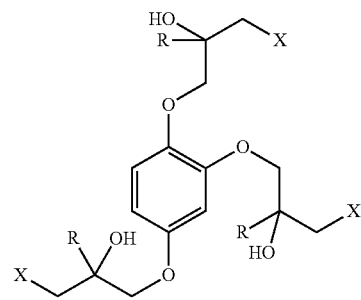

Note that, in the above formula, "X's" each independently represent a halogen atom. In addition, "R's" each independently represent a hydrogen atom or a methyl group.

The reaction temperature in the step (1) is not particularly limited, but is preferably 20 to 120° C., more preferably 30 to 110° C., and further preferably 40 to 60° C. When the reaction temperature in the step (1) is 20° C. or higher, the reaction in the step (1) may suitably proceed, and thus such a reaction temperature is preferred. On the other hand, when the reaction temperature in the step (1) is 120° C. or lower, side reactions can be prevented or suppressed, and thus such a reaction temperature is preferred.

Furthermore, the reaction time in the step (1) is not particularly limited, but is preferably 0.5 hours or longer, more preferably 1 to 50 hours, and further preferably 10 to 30 hours. When the reaction time in the step (1) is 0.5 hours or longer, the reaction suitably proceeds and side reactions can be prevented or suppressed, and thus such a reaction time is preferred.

(Step (2))

The step (2) is a step of subjecting a reaction product obtained in the step (1) to a ring-closing reaction in the presence of a basic compound.

Reaction Product Obtained in Step (1)

The reaction product obtained in the step (1) contains the tris(3-halogeno-2-hydroxypropyl ether) intermediate obtained by a first reaction. Besides them, a first by-product, the 1,2,4-trihydroxybenzene unreacted, the epihalohydrin unreacted, a reaction solvent, and impurities may be contained.

Basic Compound

The basic compound has the function of making the reaction condition in the step (2) into a basic condition and to promote a ring-closing reaction.

The basic compound is not particularly limited, but examples thereof include potassium hydroxide, sodium hydroxide, barium hydroxide, magnesium hydroxide, sodium carbonate, and potassium carbonate. Among them, potassium hydroxide or sodium hydroxide is preferably used. Note that the basic compounds may be used alone or in combination of two or more thereof.

The amount of the basic compound added is not particularly limited, but is preferably 0.8 to 1.5 mol per mole of the phenolic hydroxy group in the 1,2,4-trihydroxybenzene, and more preferably 0.9 to 1.3 mol. When the amount of the basic compound added is 0.8 mol or more, the ring-closing reaction in the step (2) may suitably proceed, and thus such an amount is preferred. On the other hand, when the amount of the basic compound added is 1.5 mol or less, side reactions can be prevented or suppressed, and thus such an amount is preferred. Note that, when a basic compound is used in the step (1), the amount mentioned above is preferably the total amount including the amount of the basic compound used in the step (1).

Reaction in Step (2)

The reaction in the step (2) mainly includes a reaction in which the 3-halogeno-2-hydroxypropyl ether groups in the tris(3-halogeno-2-hydroxypropyl ether) intermediate undergo a glycidylation reaction under a basic condition to provide a triglycidyl form of 1,2,4-trihydroxybenzene as shown below.

[Chem. 3]

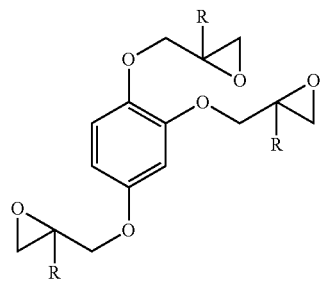

Note that, in the above formula, "R's" each independently represent a hydrogen atom or a methyl group.

The reaction temperature in the step (2) is not particularly limited, but is preferably 30 to 120° C. and more preferably 25 to 80° C.

In addition, the reaction pressure in the step (2) is preferably a normal pressure (1 atm (760 mmHg)). When the reaction in the step (2) is performed under a reaction pressure less than 1 atm, i.e., under a reduced pressure, the epoxylation ring-closing reaction easily proceeds due to removal of water in the system, tending to increase cyclic structures.

Furthermore, the reaction time in the step (2) is not particularly limited, but is preferably 0.5 to 4 hours and more preferably 1 to 3 hours.

Note that a further step of purification may be used to allow the reaction in the step (2) to suitably proceed.

[Reaction Product]

The reaction product contains a cyclic compound having a cyclic structure that contains oxygen atoms at the 1-position and the 2-position derived from 1,2,4-trihydroxybenzene as constitutional atoms. In addition, the reaction product typically contains 1,2,4-triglycidyloxybenzene (herein also referred to as a "triglycidyl form of 1,2,4-trihydroxybenzene"). Besides them, an oligomer, another glycidyl form, a solvent, and another compound may further be contained.

Note that, in an embodiment, since the reaction product contains the triglycidyl form of 1,2,4-trihydroxybenzene, the epoxy resin may have desirable physical properties. Specifically, the triglycidyl form of 1,2,4-trihydroxybenzene has three glycidyl forms. Thus, the degree of crosslinking is high and a cured product excellent in thermal resistance can be provided. In addition, in the triglycidyl form of 1,2,4-trihydroxybenzene, two glycidyl forms are adjacent to each other. The adjacent glycidyl groups are tightly packed upon a crosslinking reaction to provide a cured product excellent in elastic modulus.

In addition, in an embodiment, cyclic compounds, oligomers, and the like contained in the reaction product are produced as a result of side reactions of the glycidylation reaction of 1,2,4-trihydroxybenzene, and as described above, the cyclic compounds, the oligomers, and the like may have an influence on the physical properties of the epoxy resin or the physical properties of a cured product thereof. Here, the side reactions can be controlled by regulating the reaction conditions. In this manner, not only the content of the triglycidyl form of 1,2,4-trihydroxybenzene but also the content of the cyclic compounds, the oligomers, and the like can be controlled.

For example, the step (1) provides a tris(3-halogeno-2-hydroxypropyl ether) intermediate as described above, but depending on the reaction conditions, a side reaction of partially closing the 3-halogeno-2-hydroxypropyl ether groups may occur to produce an intermediate having a glycidyl group(s) and a hydroxy group(s). In this case, when such an intermediate produced by a side reaction undergoes an innermolecular reaction, a cyclic compound is produced, while when such an intermediate undergoes an intermolecular reaction, an oligomer is produced. Thus, when a side reaction to produce an intermediate having a glycidyl group(s) and a hydroxy group(s) is controlled in the step (1), the amounts of the cyclic compound and the oligomer tend to be able to be controlled. For example, when the step (1) is performed under a high temperature condition, the side reaction to produce a glycidyl group is promoted and the amounts of the cyclic compound and the oligomer in the obtained reaction product may be high values. On the other hand, when the step (1) is performed under a low temperature condition, the reaction to produce a glycidyl group is relatively suppressed and the amounts of the cyclic compound and the oligomer in the obtained reaction product may be low values. In addition, when the step (1) is performed in a short time, many unreacted hydroxy groups remain and react with glycidyl groups produced in the step (2), whereby the amounts of the cyclic compound and the oligomer in the reaction product may be high values.

In addition, regarding the step (2), a triglycidyl form of 1,2,4-trihydroxybenzene is obtained from the tris(3-halogeno-2-hydroxypropyl ether) intermediate as described above. Then, also in the step (2), since an intermediate having a glycidyl group(s) and a hydroxy group(s) is present in the system in the course of the reaction, side reactions may occur depending on the reaction conditions to produce a cyclic compound and an oligomer. Thus, in the step (2), when the content of the intermediate having a glycidyl group(s) and a hydroxy group(s) is controlled in the course of the reaction, the amounts of the cyclic compound and the oligomer produced by the side reactions tend to be able to be controlled. For example, when the reaction in the step (2) is performed under a reduced pressure, the glycidylation reaction is promoted due to removal of water in the system and the content of the intermediate having a glycidyl group(s) and a hydroxy group(s) is increased. Accordingly, the possibility of occurrence of the side reactions increases and the amounts of the cyclic compound and the oligomer in the obtained reaction product may be high values. On the other hand, when the step (2) is performed under a normal pressure, the reaction rate of the glycidylation reaction is decreased, resulting in a low content of the intermediate having a glycidyl group(s) and a hydroxy group(s). Accordingly, the possibility of occurrence of the side reactions decreases and the amounts of the cyclic compound and the oligomer in the obtained reaction product may be low values.

Note that the content of each component in the reaction product can be controlled by various method. For example, the reaction can be controlled by controlling the amount of 1,2,4-trihydroxybenzene added, the kind and amount of the epihalohydrin added, the kinds and amounts of the quaternary onium salt and the basic compound added, the reaction temperature, the reaction pressure, the reaction time, etc. in the step (1) described above. In addition, the reaction can also be controlled by adding or removing raw materials, products, and the like in the step (1). Furthermore, the reaction can be controlled by adjusting the kind and amount of the basic compound added, the reaction temperature, the reaction pressure, the reaction time, the reaction rate, etc. in the step (2) described above. In addition, the reaction may be controlled by, for example, adding or removing products, etc. in the step (2). As a result, the content of each component in the reaction product can be controlled.

(1,2,4-Triglycidyloxybenzene (Triglycidyl Form of 1,2,4-Trihydroxybenzene))

1,2,4-Triglycidyloxybenzene has the following structure.

[Chem. 4]

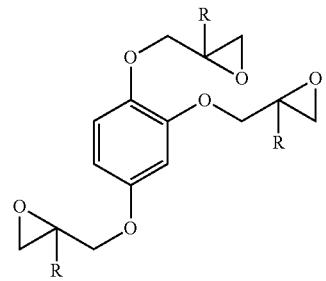

Note that, in the above formula, "R's" each independently represent a hydrogen atom or a methyl group.

The content of the 1,2,4-triglycidyloxybenzene is preferably 70% or more, more preferably 77% or more, further preferably 79% or more, and particularly preferably 79 to 90%. Note that the "content of 1,2,4-triglycidyloxybenzene" herein means the proportion of the area in a gel permeation chromatography (GPC) measurement, and more specifically, the proportion of the area occupied by 1,2,4-triglycidyloxybenzene in a GPC chart obtained by a GPC measurement of a reaction product (the proportion of the area in the GPC measurement). As a specific method of GPC measurement, a method described in Examples is employed.

(Cyclic Compound)

The cyclic compound has a cyclic structure that contains oxygen atoms at the 1-position and the 2-position derived from 1,2,4-trihydroxybenzene as constitutional atoms. When the cyclic compound is contained in a certain amount (0.003 to 0.070 mol based on 100 g of an epoxy resin), crystallization of the epoxy resin can be suppressed and the epoxy resin can be excellent in operability. Furthermore, a cured product superior in mechanical characteristics (bending strength, bending modulus, bending strain, toughness (bending), tensile strength, tensile modulus, elongation, toughness (tensile), etc.) as compared to the case of containing substantially no cyclic compound can be obtained.

The cyclic compound is not particularly limited, but specific examples thereof include the compounds shown below and compounds obtained by further reacting such a compound with an epihalohydrin.

[Chem. 5]

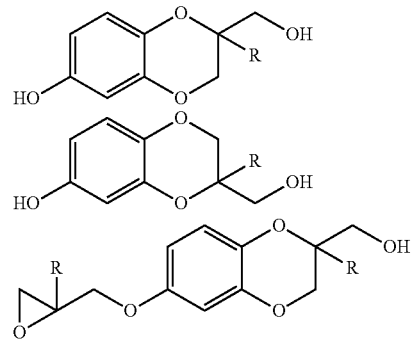

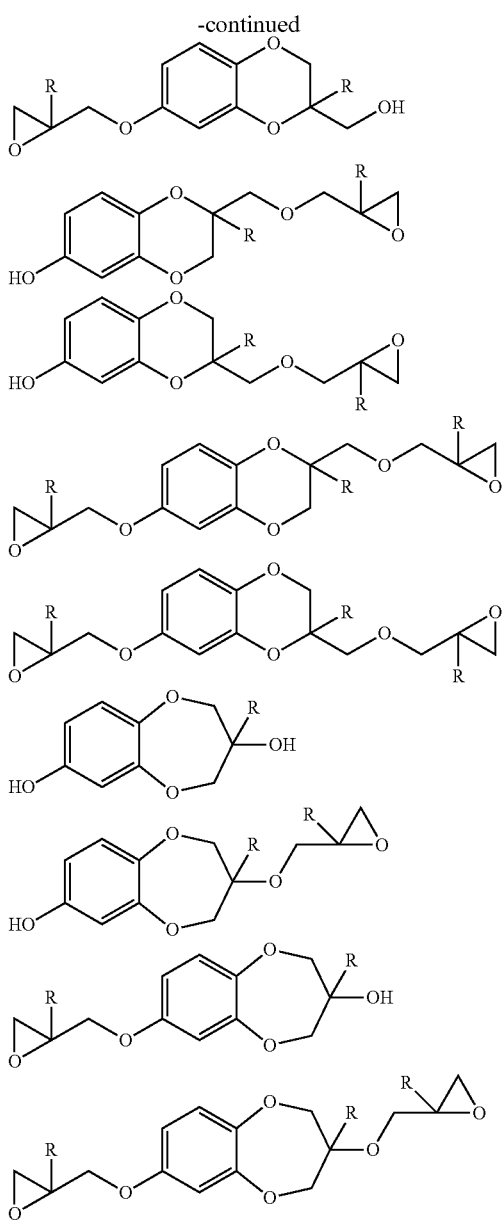

Note that, in the above formulae, "R's" each independently represent a hydrogen atom or a methyl group.

The above-mentioned cyclic compounds may be contained alone or in combination of two or more thereof.

The content of the cyclic compound is 0.003 to 0.070 mol based on 100 g of the epoxy resin, preferably 0.003 to 0.060 mol, more preferably 0.010 to 0.060 mol, further preferably 0.030 to 0.060 mol, and particularly preferably 0.050 to 0.060 mol. When the content of the cyclic compound is more than 0.070 mol, suitable pyrolysis resistance cannot be obtained in a resulting cured product. On the other hand, when the content of the cyclic compound is less than 0.003 mol, the epoxy resin is crystallized. In addition, mechanical characteristics (bending strength, bending modulus, bending strain, toughness (bending), tensile strength, tensile modulus, elongation, toughness (tensile), etc.) tend to be lowered. Note that, as the "content of the cyclic compound" herein, a value measured by a method described in Examples is employed. In addition, when two or more cyclic compounds are contained, the "content of the cyclic compound" means the total content thereof.

Note that the content of the cyclic compound can be adjusted by controlling the reaction as described above. Such adjustment of the content of the cyclic compound can be achieved, for example, by appropriately adjusting the amount of 1,2,4-trihydroxybenzene added, the kind and amount of the epihalohydrin added, the kinds and amounts of the quaternary onium salt and the basic compound added, the reaction temperature, the reaction pressure, the reaction time, etc. in the step (1) described above. In addition, the adjustment can also be achieved by adding or removing raw materials, products, etc. in the step (1). Furthermore, the adjustment can be achieved by appropriately adjusting the kind and amount of the basic compound added, the reaction temperature, the reaction pressure, the reaction time, the reaction rate, etc. in the step (2) described above. In addition, the adjustment can be achieved by adding or removing products, etc. in the step (2).

(Oligomer)

The reaction product may contain an oligomer. Note that the "oligomer" herein means a compound obtained by reacting molecules of 1,2,4-trihydroxybenzene or a derivative thereof to each other. Thus, it can also be said that an oligomer has a structure having a plurality of 1,2,4-trihydroxybenzene backbones.

The oligomer is not particularly limited, and examples thereof include oligomers produced by a reaction of one or two or more of the tris(3-halogeno-2-hydroxypropyl ether) intermediate, a bis(3-halogeno-2-hydroxypropyl ether) intermediate, and a mono(3-halogeno-2-hydroxypropyl ether) intermediate obtained by the step (1) described above; and oligomers produced by a reaction of a bi- or higher-functional epoxy compound, such as 1,2,4-triglycidyloxybenzene, and a bi- or higher-functional polyhydric phenol, such as 1,2,4-trihydroxybenzene.

The above-mentioned oligomers may be contained alone or in combination of two or more thereof.

The content of the oligomer is preferably 7.5% or less, more preferably 4.5% or less, further preferably 4.0% or less, and particularly preferably 0.05 to 3.0%. When the content of the oligomer is 7.5% or less, the viscosity of the epoxy resin may be decreased and the elongation of a resulting cured product may be enhanced, and thus such a content is preferred. Note that the "content of an oligomer" means the proportion of the area in a gel permeation chromatography (GPC) measurement, and more specifically, the proportion of the area occupied by the oligomer in a GPC chart obtained by a GPC measurement of a reaction product (the proportion of the area in the GPC measurement). As a specific method for the GPC measurement, a method described in Examples is employed. Note that, when two or more oligomers are contained, the "content of the oligomer" means the total content thereof.

The adjustment of the content of oligomer may also be achieved by appropriately adjusting the amount of 1,2,4-trihydroxybenzene added, the kind and amount of the epihalohydrin added, the kinds and amounts of the quaternary onium salt and the basic compound added, the reaction temperature, the reaction pressure, the reaction time, etc. in the step (1) as with the case of the cyclic compound. In addition, the adjustment can also be achieved by adding or removing raw materials, products, etc. in the step (1). Furthermore, the adjustment can be achieved by appropriately adjusting the reaction temperature, the reaction pressure, the reaction time, etc. in the step (2) described above.

(Another Glycidyl Form)

The reaction product may contain another glycidyl form. Another glycidyl form means a compound having a glycidyl group except for 1,2,4-triglycidyloxybenzene, the cyclic compounds, and the oligomers.

Examples of the other glycidyl forms include diglycidyl forms of 1,2,4-trihydroxybenzene and monoglycidyl forms of 1,2,4-trihydroxybenzene represented by the following structures, and derivatives thereof. Here, the "derivative" means a compound obtained by reacting a glycidyl group(s) in a diglycidyl form of 1,2,4-trihydroxybenzene or a monoglycidyl form of 1,2,4-trihydroxybenzene with an epihalohydrin through a ring-opening addition reaction.

[Chem. 6]

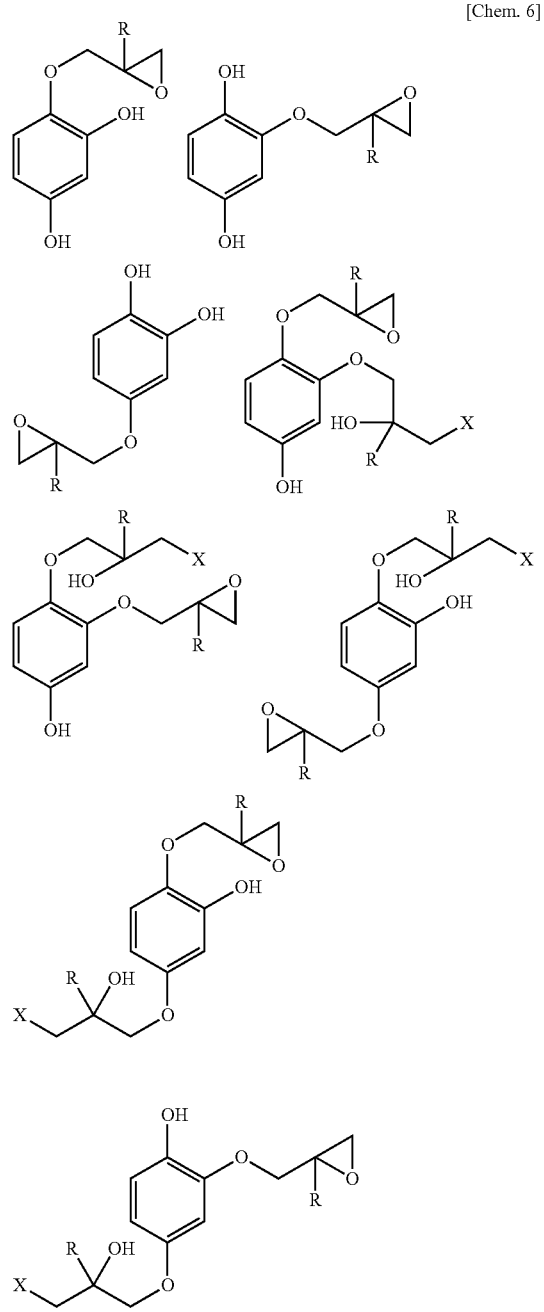

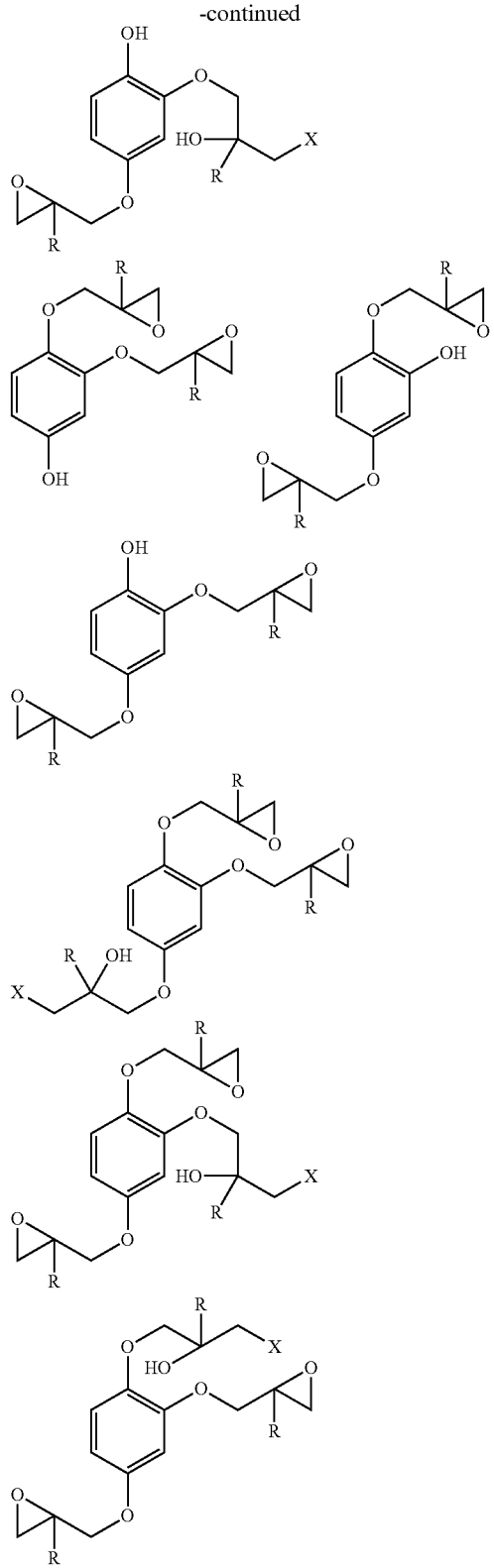

Note that, in the above formulae, "X's" each independently represent a halogen atom. In addition, "R's" each independently represent a hydrogen atom or a methyl group.

The above-mentioned other glycidyl forms may be contained alone or in combination of two or more thereof.

(Solvent)

The solvent is not particularly limited, but examples thereof include, in addition to the reaction solvent mentioned above, water, a solvent, and the like which may be purposely added in a purification step or the like.

The content of the solvent is preferably 5 parts by mass or less based on 100 parts by mass of the solid amount in an epoxy resin, and more preferably 1 part by mass or less. Note that the "solid amount in an epoxy resin" herein means the total mass of the components in the epoxy resin except for the solvent. Thus, when the epoxy resin contains no solvent, the total mass of the epoxy resin is equal to the solid amount.

(Another Compound)

Another compound is not particularly limited, and examples thereof include compounds except for the products produced in the reaction of 1,2,4-trihydroxybenzene and the epihalohydrin. Specific examples thereof include the 1,2,4-trihydroxybenzene unreacted, the epihalohydrin unreacted, the quaternary onium salt unreacted, the basic compound unreacted, and compounds derived therefrom (byproducts, etc.).

Note that, since control of reaction conditions and purification are typically performed, the content of the other compound tends to be low.

The content of the other compound is preferably 5% by mass or less based on the solid amount of an epoxy resin, and more preferably 0.05 to 5% by mass.

[Configuration of Epoxy Resin]

The epoxy resin according to this embodiment is the reaction product described above.

The epoxy equivalent of the epoxy resin is preferably 105 g/eq or more, more preferably 105 g/eq or more and less than 125 g/eq, and further preferably 105 to 120 g/eq. When the epoxy equivalent of the epoxy resin is 105 g/eq or more, mechanical characteristics, such as bending toughness and tensile strength, may be increased, and thus such an epoxy equivalent is preferred. Note that, as a value of the "epoxy equivalent" herein, a value measured by a method described in Examples is employed.

The viscosity of the epoxy resin at 25° C. is not particularly limited, but is preferably 1500 to 5000 mPa·s and more preferably 2000 to 4500 mPa·s. When the viscosity of the epoxy resin at 25° C. is 1500 mPa·s or more, drip in molding can be suppressed, and thus such a viscosity is preferred. On the other hand, when the viscosity of the epoxy resin at 25° C. is 5000 mPa·s or less, the epoxy resin is excellent in infiltration ability, and thus such a viscosity is preferred. Note that, as a value of the "viscosity of the epoxy resin at 25° C." herein, a value measured by a method described in Examples is employed.

The adjustment of the components and physical properties of the epoxy resin may be achieved by controlling the reaction, may be achieved by controlling a purification step, or may be achieved by separately adding a component. In this case, from the viewpoint of capable of effectively preparing the epoxy resin, the contents of components in the epoxy resin are preferably adjusted by controlling the reaction.

<Epoxy Resin Composition>

According to an embodiment of the present invention, an epoxy resin composition is provided. The epoxy resin composition contains the epoxy resin described above and a curing agent. Besides them, the epoxy resin composition may further contain another epoxy resin, another resin, a curing promoter, an organic solvent, an additive, or the like, as required

[Epoxy Resin]

As the epoxy resin, the epoxy resin described above may be used and therefore the explanation is omitted here.

The content of the epoxy resin is preferably 30 to 99% by mass based on the solid amount in the resin composition, and more preferably 40 to 97% by mass. When the content of the epoxy resin is 30% by mass or more, the performance of the epoxy resin is easily exhibited, and thus such a content is preferred. On the other hand, when the content of the epoxy resin is 99% by mass or less, a wide variety of curing agents can be selected, and thus such a content is preferred. Note that the "solid amount in a resin composition" means the total mass of the components in the composition except for a solvent described later. Accordingly, when the resin composition contains no solvent, the total mass of the composition is equal to the solid amount.

[Another Epoxy Resin]

Another epoxy resin is not particularly limited, but examples thereof include a bisphenol-type epoxy resin, such as a bisphenol A-type epoxy resin or a bisphenol F-type epoxy resin; a biphenyl-type epoxy resin, such as a biphenyl-type epoxy resin or a tetramethylbiphenyl-type epoxy resin; a novolac-type epoxy resin, such as a phenol novolac-type epoxy resin, a cresol novolac-type epoxy resin, a bisphenol A novolac-type epoxy resin, or a biphenyl novolac-type epoxy resin; a triphenylmethane-type epoxy resin; a tetraphenylethane-type epoxy resin; a dicyclopentadiene-phenol addition reaction-type epoxy resin; a phenol aralkyl-type epoxy resin; a naphthol novolac-type epoxy resin, a naphthol aralkyl-type epoxy resin, a naphthol-phenol co-condensation novolac-type epoxy resin, a naphthol-cresol co-condensation novolac-type epoxy resin, a diglycidyloxy naphthalene, and a phosphorus atom-containing epoxy resin.

The above-mentioned other epoxy resins may be used alone or in combination of two or more thereof.

[Another Resin]

Another resin means a resin other than the epoxy resin. The other resin may be a thermosetting resin or a thermoplastic resin. The other resin is not particularly limited, but specific examples thereof include a polycarbonate resin, a polyphenylene ether resin, a polyethylene terephthalate resin, a polybutylene terephthalate resin, a polyethylene resin, a polypropylene resin, a polyimide resin, a polyamideimide resin, a polyetherimide resin, a polyethersulfone resin, a polyketone resin, a polyetherketone resin, a polyetheretherketone resin, and a phenol resin. The above-mentioned other resins may be used alone or in combination of two or more thereof.

[Curing Agent]

The curing agent is not particularly limited, but examples thereof include an amine compound, an amide compound, an acid anhydride compound, and a phenol compound.

Examples of the amine compounds include ethylenediamine, diaminopropane, diaminobutane, diethylenetriamine, triethylenetetramine, 1,4-cyclohexanediamine, isophoronediamine, diaminodicyclohexylmethane, diaminodiphenylmethane, diaminodiphenyl sulfone, phenylenediamine, imidazole, a BF3-amine complex, dicyandiamide, and guanidine derivatives.

An example of the amide compound is a polyamide resin synthesized from the dimer of linolenic acid and ethylene diamine.

Examples of the acid anhydride compounds include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Examples of the phenol compounds include a phenol novolac resin, a cresol novolac resin, an aromatic hydrocarbon formaldehyde resin-modified phenol resin, a dicyclopentadiene phenol-addition-type resin, a phenol aralkyl resin, an α-naphthol aralkyl resin, a β-naphthol aralkyl resin, a biphenyl aralkyl resin, a triphenylolmethane resin, a tetraphenylolethane resin, a naphthol novolac resin, a naphthol-phenol co-condensation novolac resin, a naphthol-cresol co-condensation novolac resin, and an aminotriazine-modified phenol resin which is a copolymer of an amino group-containing triazine compound (melamine, benzoguanamine, etc.), a phenol (phenol, cresol, etc.), and formaldehyde.

Among them, an amine compound or a phenol compound is preferably used, and a diaminodiphenyl sulfone, a phenol novolac resin, a cresol novolac resin, a phenol aralkyl resin, an α-naphthol aralkyl resin, a β-naphthol aralkyl resin, a biphenyl aralkyl resin, or an aminotriazine-modified phenol resin is more preferably used.

Note that the above-mentioned cured products may be used alone or in combination of two or more thereof.

The content of the curing agent is preferably 1 to 70% by mass based on the solid amount in the resin composition, and more preferably 3 to 60% by mass. When the content of the curing agent is 1% by mass or more, a wide variety of curing agents can be selected, and thus such a content is preferred. On the other hand, when the content of the curing agent is 70% by mass or less, the performance of the epoxy resin is easily exhibited, and thus such a content is preferred.

[Curing Promoter]

A curing promoter has the function of promoting curing. This can lead to reduction in the reaction time, prevention or reduction of the generation of an unreacted epoxy compound, and the like.

The curing promoter is not particularly limited, but examples thereof include a phosphorous compound, a tertiary amine, an imidazole, an organic acid metal salt, a Lewis acid, an amine complex, and a urea derivative. Among them, an imidazole is preferably used. Note that the curing promoters may be used alone or in combination of two or more thereof.

The content of the curing promoter is preferably 0.1 to 10% by mass based on the solid amount in the epoxy resin composition, and more preferably 0.5 to 5% by mass. When the content of the curing promoter is 0.1% by mass or more, curing can be promoted, and thus such a content is preferred. On the other hand, when the content of the curing promoter is 10% by mass or less, the pot life can be increased, and thus such a content is preferred.

[Organic Solvent]

The organic solvent has the function of adjusting the viscosity of the epoxy resin composition. This may lead to improvement of, for example, the infiltration ability into a substrate.

The organic solvent is not particularly limited, but examples thereof include a ketone, such as acetone, methyl ethyl ketone, methyl isobutyl ketone, or cyclohexanone; an acetic acid ester, such as ethyl acetate, butyl acetate, cellosolve acetate, propylene glycol monomethyl ether acetate, carbitol acetate, ethyldiglycol acetate, or propylene glycol monomethyl ether acetate; an alcohol, such as isopropyl alcohol, butanol, cellosolve, or butyl carbitol; an aromatic hydrocarbon, such as toluene or xylene; and an amide, such as dimethyl formamide, dimethylacetamide, or N-methylpyrrolidone. Among them, an alcohol or a ketone is preferably used, and butanol or methyl ethyl ketone is more preferably used. Note that the solvents may be used alone or in combination of two or more thereof.

The content of the organic solvent is preferably 10 to 60 parts by mass based on 100 parts by mass of the solid amount in the epoxy resin composition, and more preferably 20 to 50 parts by mass. When the content of the organic solvent is 10 parts by mass or more, the viscosity can be decreased, and thus such a content is preferred. On the other hand, when the content of the organic solvent is 60 parts by mass or less, nonvolatile components can be reduced, and thus such a content is preferred.

[Additive]

The additive which may be contained in the epoxy resin composition is not particularly limited, but examples thereof include an inorganic filler, a reinforcing fiber, a flame retardant, a mold release agent, a pigment, an antioxidant, a UV absorber, a light stabilizer, an antistatic agent, and a conductivity imparting agent. The additives may be used alone or in combination of two or more thereof.

[Application]

In an embodiment, the epoxy resin composition can be applied in a fiber-reinforced composite material, a heat dissipation member, an adhesive, a paint, a semiconductor, a printed circuit board, or other applications.

<Cured Product>

According to an embodiment of the present invention, a cured product is provided. The cured product is obtained by curing the epoxy resin composition. The cured product has high pyrolysis resistance.

The form of the cured product is not particularly limited, and may be a sheet form or a form in which another material (fibrous reinforcing material, etc.) is impregnated with the cured product.

The glass transition point (Tg) of the cured product (Tg) is not particularly limited, but is preferably 160 to 350° C., more preferably 200 to 300° C., further preferably 220 to 275° C., and particularly preferably 240 to 250° C. When the glass transition point (Tg) is 160° C. or higher, the thermal resistance can be increased, and thus such a glass transition point is preferred. On the other hand, when the glass transition point (Tg) is 350° C. or lower, the cured product is excellent in toughness, and thus such a glass transition point is preferred. Note that, as a value of the "glass transition point (Tg)" herein, a value measured by a method described in Examples is employed.

The rate of thermal reduction at 300° C. of the cured product is preferably 1.2% or less, more preferably 1.0% or less, further preferably 0.75% or less, particularly preferably 0.5% or less, and the most preferably 0.001 to 0.5%. When the rate of thermal reduction of the cured product is 1.2% or less, the pyrolysis resistance is high and influence of vaporization of the cyclic compound contained and the like are small, and thus such a rate of thermal reduction is preferred. Note that, as a value of the "rate of thermal reduction" herein, a value measured by a method described in Examples is employed.

The curing temperature of the epoxy resin composition is preferably 50 to 250° C. and more preferably 70 to 200° C. When the curing temperature is 50° C. or higher, a curing reaction rapidly proceeds, and thus such a curing temperature is preferred. On the other hand, when the curing temperature is 250° C. or lower, the amount of the energy required in curing can be suppressed, and thus such a curing temperature is preferred.

EXAMPLES

The present invention will be described with reference to examples below, but the present invention is not to be limited to the description in the examples. Note that the expression, "parts", is used herein, but unless otherwise specified, it represents "parts by mass".

Note that GPC and $^{13}$C NMR were measured under the following conditions.

<GPC Measurement Conditions>
Measurement apparatus: "HLC-8220 GPC" manufactured by Tosoh Corporation,
Column: guard column "HXL-L" manufactured by Tosoh Corporation
+"TSK-GEL G2000HXL" manufactured by Tosoh Corporation
+"TSK-GEL G2000HXL" manufactured by Tosoh Corporation
+"TSK-GEL G3000HXL" manufactured by Tosoh Corporation
+"TSK-GEL G4000HXL" manufactured by Tosoh Corporation
Detector: RI (differential refractive index detector)
Data processor: "GPC-8020 model II version 4.10" manufactured by Tosoh Corporation
Measurement conditions: Column temperature: 40° C.
  Eluent: tetrahydrofuran
  Flow rate: 1.0 ml/min
Standard: the following monodispersed polystyrenes having known molecular weights were used according to the measurement manual of "GPC-8020 model II version 4.10".
(Polystyrenes used)
  "A-500" manufactured by Tosoh Corporation
  "A-1000" manufactured by Tosoh Corporation
  "A-2500" manufactured by Tosoh Corporation
  "A-5000" manufactured by Tosoh Corporation
  "F-1" manufactured by Tosoh Corporation
  "F-2" manufactured by Tosoh Corporation
  "F-4" manufactured by Tosoh Corporation
  "F-10" manufactured by Tosoh Corporation
  "F-20" manufactured by Tosoh Corporation
  "F-40" manufactured by Tosoh Corporation
  "F-80" manufactured by Tosoh Corporation
  "F-128" manufactured by Tosoh Corporation
Sample: a solution in tetrahydrofuran of 1.0 mass % in terms of the resin solid amount was filtered through a microfilter (50 μl) to obtain a sample.
<Measurement Conditions of $^{13}$C-NMR>
Apparatus: JNM-ECA500 manufactured by JOEL
Measurement mode: inverse gated decoupling
Solvent: deuterated dimethyl sulfoxide
Pulse angle: 30° pulse
Sample concentration: 30 wt %
Number of integrations: 4000
Reference of chemical shift: peak of dimethyl sulfoxide: 39.5 ppm.

Example 1

<Production of Epoxy Resin>
(Step (1))

Into a flask equipped with a thermometer, a dropping funnel, a condenser, a nitrogen inlet tube, and a stirrer were added 126 g (1.00 mol) of 1,2,4-trihydroxybenzene and 1388 g (15 mol) of epichlorohydrin, and the mixture was heated to 50° C. Next, 11.2 g (0.06 mol) of benzyltrimethylammonium chloride was added and the mixture was stirred at 50° C. for 24 hours.

(Step (2))

To the reaction solution obtained in the step (1), 1000 mL of distilled water was poured, the mixture was stirred, and after allowing the mixture to stand, the supernatant was removed. Then, 318 g of a 48% aqueous sodium hydroxide solution was added dropwise over 2.5 hours and the mixture was stirred for 1 hour.

To the resulting solution, 460 mL of distilled water was poured and the solution was allowed to stand. The lower salt solution layer was removed and epichlorohydrin was collected by distillation at 120° C. Next, 500 g of methyl isobutyl ketone (MIBK) and 147 g of water were sequentially added and the solution was washed with water at 80° C. After removing the lower washing water layer, dehydration and filtration were performed, and the solvent, MIBK, was removed at 150° C. to thereby produce an epoxy resin.

Note that, in visual observation of the obtained epoxy resin, production of crystallization was not recognized and the epoxy resin was liquid.

For the obtained epoxy resin, the content X (mol) of the cyclic compound in 100 g of the epoxy resin was measured. Specifically, the content was calculated using the following formula.

$$X=(100 \times A)/(B \times C) \qquad \text{[Math. 1]}$$

In the above formula, X is the amount (mol) of the cyclic compound contained in 100 g of the epoxy resin, (A) is the amount (mol) of the cyclic compound per mole of the aromatic ring, (B) is the amount (mol) of the epoxy group per mole of the aromatic ring, and (C) is the epoxy equivalent (g/eq).

Here, (A) was calculated from the ratio of the integration of a peak attributable to the cyclic compound at around 60 ppm to that of a peak attributable to the aromatic ring corresponding to the ipso-position of 1,2,4-trihydroxybenzene at around 130 to 150 ppm in a $^{13}$C NMR measurement. In addition, (B) was calculated from the ratio of the integration of a peak attributable to the epoxy group at around 50 ppm to that of the peak attributable to the aromatic ring at the ipso-position of 1,2,4-trihydroxybenzene at around 130 to 150 ppm.

As a result, the content of the cyclic compound was 0.057 mol/100 g. Note that FIG. 1 shows a $^{13}$C NMR chart of the epoxy resin produced in Example 1.

In addition, for the obtained epoxy resin, the proportion of the area of 1,2,4-triglycidyloxybenzene (the triglycidyl form of 1,2,4-trihydroxybenzene) was measured in a GPC measurement. As a result, the content of the triglycidyl form of 1,2,4-trihydroxybenzene was 80% in terms of the proportion of the area in a GPC measurement.

Furthermore, the proportion of the area of the oligomer was measured in a GPC measurement. As a result, the content of the triglycidyl form of 1,2,4-trihydroxybenzene was 2.8% in terms of the proportion of the area in a GPC measurement.

In addition, for the obtained epoxy resin, the epoxy equivalent was measured. Specifically, the epoxy equivalent of the epoxy resin was measured according to the method of JIS K 7236:2009. As a result, the epoxy equivalent of the epoxy resin was 115 g/eq.

Furthermore, the viscosity of the obtained epoxy resin was measured. Specifically, the viscosities of the epoxy resin at 20° C. and 25° C. were measured with an E-type viscometer (TV-22 manufactured by Toki Sangyo Co., Ltd). As a result, the viscosity at 20° C. and the viscosity of 25° C. of the epoxy resin were 7600 mPa·s and 3900 mPa·s, respectively.

The obtained results are shown in Table 1 below.

<Production of Epoxy Resin Composition>

Under conditions of 100° C. and 2 hours, 30 parts of a curing agent, 4,4'-diaminodiphenyl sulfone, was melt mixed with 70 parts of the above-mentioned epoxy resin to obtain an epoxy resin composition.

<Production of Cured Product>

The epoxy resin composition produced above was poured between glass plates with a 2 mm spacer interposed therebetween and was subjected to a curing reaction at 150° C. for 1 hour and then at 180° C. at 3 hours to produce a cured product.

Example 2

<Production of Epoxy Resin>

An epoxy resin was produced in the same manner as in Example 1 except for changing the time for heating and stirring at 50° C. in the step (1) from 24 hours to 15 hours.

The content of the cyclic compound, the proportion of the area of 1,2,4-triglycidyloxybenzene in a GPC measurement, the proportion of the area of the oligomer in a GPC measurement, the epoxy equivalent of the epoxy resin, the viscosity at 20° C. and the viscosity at 25° C. of the epoxy resin, which were measured by the same methods as in Example 1, were 0.062 mol/100 g, 78%, 4.2%, 120 g/eq, and 7700 mPa·s and 4100 mPa·s, respectively.

The obtained results are shown in Table 1 below.

<Production of Epoxy Resin Composition and Cured Product>

An epoxy resin composition and a cured product were produced in the same manner as in Example 1.

Comparative Example 1

<Production of Epoxy Resin>

An epoxy resin was produced according to the method described in PTL 1 (JP-A-61-186377) described above.

Specifically, an epoxy resin was produced in the same manner as in Example 1 except that the amount of the 48% sodium hydroxide was changed from 318 g (3.82 mol) to 333 g (4.00 mol), the time for dropwise addition was changed from 2.5 hours to 4 hours, and furthermore, that the reaction was conducted while reducing the pressure to 100 mmHg to remove water in the system by azeotropy with epichlorohydrin.

The content of the cyclic compound, the proportion of the area of 1,2,4-triglycidyloxybenzene in a GPC measurement, the proportion of the area of the oligomer in a GPC measurement, the epoxy equivalent of the epoxy resin, the viscosity at 20° C. and the viscosity at 25° C. of the epoxy resin, which were measured by the same methods as in Example 1, were 0.072 mol/100 g, 76%, 4.7%, 125 g/eq, and 9600 mPa·s and 4900 mPa·s, respectively.

The obtained results are shown in Table 1 below.

<Production of Epoxy Resin Composition and Cured Product>

An epoxy resin composition and a cured product were produced in the same manner as in Example 1.

Comparative Example 2

<Production of Epoxy Resin>

An epoxy resin was produced in the same manner as in Example and then the epoxy resin was purified by column chromatography. Ethyl acetate/hexane=1/1 was used as an eluent.

The content of the cyclic compound, the proportion of the area of 1,2,4-triglycidyloxybenzene in a GPC measurement, the proportion of the area of the oligomer in a GPC measurement, the epoxy equivalent of the epoxy resin, which were measured by the same methods as in Example 1, were 0.001 mol/100 g, 97%, 0%, and 100 g/eq, respectively. Note that this compound was solid (crystal) and thus the viscosity at 20° C. and the viscosity at 25° C. of the epoxy resin were not able to be measured.

The obtained results are shown in Table 1 below.

<Production of Epoxy Resin Composition and Cured Product>

An epoxy resin composition and a cured product were produced in the same manner as in Example 1.

TABLE 1

| | Cyclic compound (mol/100 g) | Triglycidyl form (%*) | Oligomer (%*) | Form | Epoxy equivalent (g/eq) | Viscosity (20° C.) (mPa · s) | Viscosity (25° C.) (mPa · s) |
|---|---|---|---|---|---|---|---|
| Example 1 | 0.057 | 80 | 2.8 | liquid | 115 | 7600 | 3900 |
| Example 2 | 0.062 | 78 | 4.2 | liquid | 120 | 7700 | 4100 |
| Comparative Example 1 | 0.072 | 76 | 4.7 | liquid | 125 | 9600 | 4900 |
| Comparative Example 2 | 0.001 | 97 | 0 | crystal | 100 | — (unmeasurable) | — (unmeasurable) |

*GPC area proportion

As can be seen from the results in Table 1, the epoxy resins obtained in Examples 1 and 2 were liquid and excellent in handleability.

[Evaluation of Physical Properties]

For the cured products obtained in Examples 1 to 4 and Comparative Example 1, the physical properties were evaluated.

(Rate of Thermal Reduction)

The rate of thermal reduction at 300° C. was measured with a simultaneous thermal analysis apparatus (TGA/DSC1 manufactured by METTOLER TOLEDO, amount of sample: 6 to 6.5 mg, aluminum sample pan size: 05×2.5 mm, rate of temperature increase: 10° C./min, flow rate of nitrogen: 100 ml/min, temperature range: 40 to 600° C.). The obtained results are shown in Table 2 below.

(Glass Transition Point)

Using a viscoelasticity measurement apparatus (DMA: solid viscoelasticity measurement apparatus, RSAII, manufactured by Rheometric, rectangular tension method; frequency: 1 Hz, rate of temperature increase: 3° C./min, maximum measurement temperature: 350), a temperature at which the loss tangent, which is the ratio of the loss modulus to the storage modulus, was the maximum value (the value of tan δ was the largest) was measured for each cured product, and the temperature was recorded as the glass transition temperature (Tg). The obtained results are shown in Table 2 below.

(Bending Strength, Bending Modulus, Bending Strain, Bending Toughness)

According to JIS K7171, a bending test was performed using AUTOGRAPH AG-X/R manufactured by Shimadzu Corporation, and the bending strength, the bending modulus, and the bending strain of each cured product were measured. In addition, the integration of an S-S curve obtained by the bending test was taken to calculate the energy, and the energy per unit area of a test piece was taken as the toughness (bending). The obtained results are shown in Table 2 below.

(Tensile Strength, Tensile Modulus, Elongation, Tensile Toughness)

According to JIS K7161, a tensile test was performed using AUTOGRAPH AG-Xplus manufactured by Shimadzu Corporation, and the tensile strength, the tensile modulus, and the elongation of each cured product were measured. In addition, the integration of an S-S curve obtained by the tensile test was taken to calculate the energy and the energy per unit area of a test piece was taken as the toughness (tensile). The obtained results are shown in Table 2.

TABLE 2

|  | Rate (%) of thermal reduction at 300° C. | Glass transition point (Tg) (° C.) | Bending strength (MPa) | Bending modulus (MPa) | Bending strain (%) | Toughness (bending) (MPa) | Tensile strength (MPa) | Tensile modulus (MPa) | Elongation (%) | Toughness (tensile) (MPa) |
|---|---|---|---|---|---|---|---|---|---|---|
| Example 1 | 0.3 | 246 | 158 | 4100 | 5.5 | 5.1 | 87 | 3900 | 3.3 | 1.7 |
| Example 2 | 0.9 | 241 | 161 | 4000 | 5.3 | 4.9 | 71 | 4100 | 2.3 | 0.9 |
| Comparative Example 1 | 1.3 | 239 | 157 | 4000 | 5.1 | 4.6 | 72 | 4200 | 2.2 | 0.9 |
| Comparative Example 2 | — | >300 | 123 | 3900 | 4.3 | 3.1 | 61 | 3900 | 2.1 | 0.8 |

The results in Table 2 indicate that the cured products obtained in Examples 1 and 2 have a low rate of thermal reduction and a high pyrolysis resistance.

The invention claimed is:

1. An epoxy resin comprising a reaction product of 1,2,4-trihydroxybenzene and an epihalohydrin,
    the epoxy resin containing a cyclic compound that has a cyclic structure containing, as constitutional atoms, oxygen atoms at 1-position and 2-position derived from 1,2,4-trihydroxybenzene,
    the cyclic compound being contained in an amount of 0.003 to 0.070 mol based on 100 g of the epoxy resin.

2. The epoxy resin according to claim 1, which has an epoxy equivalent of 105 g/eq or more.

3. The epoxy resin according to claim 1, which further contains 1,2,4-triglycidyloxybenzene,
    the 1,2,4-triglycidyloxybenzene being contained in an amount of 70% or more.

4. The epoxy resin according to claim 1, which further contains an oligomer,
    the oligomer being contained in an amount of 7.5% or less.

5. An epoxy resin composition comprising the epoxy resin according to claim 1 and a curing agent.

6. A cured product comprising a product produced by curing the epoxy resin composition according to claim 5.

* * * * *